United States Patent Office 3,769,261
Patented Oct. 30, 1973

3,769,261
METHOD OF PREPARING STABLE COPOLYMERS OF ETHYLENE AND AT LEAST ONE ETHYLENICALLY UNSATURATED CARBOXYLIC ACID AND THE PRODUCT OBTAINED THEREBY
Bert Howard Clampitt, Shawnee Mission, Kans., Raymond Myrl Henry, Gibsonia, Pa., and Joseph William Jones, Jr., Shawnee Mission, Kans., assignors to Gulf Research & Development Company, Pittsburgh, Pa.
Filed May 8, 1972, Ser. No. 251,144
Int. Cl. C08f 45/60
U.S. Cl. 260—45.9 R
15 Claims

ABSTRACT OF THE DISCLOSURE

A method of making a copolymer of ethylene and at least one ethylenically unsaturated carboxylic acid comprising the steps of first thermally decomposing the ester moieties of a copolymer of ethylene and the isopropyl ester of at least one ethylenically unsaturated carboxylic acid and thereafter contacting the thermally decomposed copolymer with a diamine. The resulting ethylene-carboxylic acid copolymer exhibits a storage stable melt index. The diamine contacting may be accomplished with either an aqueous solution of a suitable diamine or a vapor thereof. When an aqueous solution is employed, the contacting will generally be accomplished at a temperature between about 0 and 50° C. while a temperature between 20 and 100° C. will be used for vapor phase contacting. The contacting time is, generally, short and the copolymer product will contain less than 5000 p.p.m. by weight diamine, preferably less than 1000 p.p.m. and most preferably less than 100 p.p.m.

BACKGROUND

This invention relates to a method of stabilizing certain polymers and to the product obtained thereby. More particularly, this invention relates to a method of stabilizing the melt index of certain polymers and the product obtained thereby. Still more particularly, this invention relates to a method of stabilizing the melt index of certain polymers comprising ethylene units and acrylic and/or methacrylic acid units and the product obtained thereby.

Copolymers comprising an alpha-olefin such as ethylene and an alpha, beta-ethylenically unsaturated monocarboxylic acid such as acrylic acid and methacrylic acid are, of course, well known in the prior art. That these copolymers are useful in a broad range of applications such as self-supporting films, coating compositions, adhesives, etc. and that many, if not all, of these applications require the melt index of the copolymer to be within a defined, generally, narrow range is also known in the art. The desirability of producing such copolymers, under controllable conditions, within the range required for any particular application is, therefore, readily apparent. The desirability of producing such polymers in a manner such that the melt index thereof does not change during storage is also readily apparent.

Heretofore, several methods have been proposed for preparing copolymers of ethylene and an alpha, beta-ethylenically unsaturated monocarboxylic acids. For example, it is known that ethylene and acrylic and/or methacrylic acid may be copolymerized directly with a free-radical initiator either in the presence or absence of an inert solvent. Generally, the direct copolymerization is accomplished at temperatures above about 150° C. and pressures within the range of 50 to 3000 atmospheres. As is known in the art, the melt indices of the copolymers produced by this method can be controlled, within tolerable limits, and the melt indices of such products, generally, do not change with time after preparation. This method of preparation is not, however, generally, considered commercially acceptable due to: (1) the high costs associated with the high pressure equipment; (2) the corrosive nature of the acids at the conditions employed during polymerization; and (3) the fact that the concentration of ethylenically unsaturated acid in the product is limited, at least to some extent, by the solubility of the acid monomer in the liquid media employed in the polymerization.

It is also known in the prior art, that copolymers of ethyylene and acrylic and/or methacrylic acid can be prepared by saponification of the corresponding copolymer of ethylene and an alkyl acrylate and/or alkyl methacrylate followed by acidification. In general, the saponification will be accomplished by contacting the ethylene-alkyl acrylate and/or alkyl methacrylate copolymer with an alkali metal hydroxide at a temperature between about 260 and 290° C. and at a pressure between about 2000 and 3000 p.s.i.a. so as to convert all, or a portion, of the pendant ester groups to the carboxylate form. The carboxylate groups are then converted to the acid form by contacting the saponified polymer with a strong acid ion exchange resin, at or near room temperature, and at a pressure between about 15 and 50 p.s.i.a. Again, the melt indices of the copolymers produced by this method can be controlled, within tolerable limits, and the melt indices of such products do not, generally, change with time after production. Notwithstanding the acceptability of the product, however, this process too is not generally considered commercially acceptable due to the high number of steps required therein and the relatively high costs associated therewith.

In an effort to overcome the costs and other disadvantages of these prior art processes, it has recently been discovered that copolymers of ethylene and acrylic and/or methacrylic acid can be produced by thermally decomposing a corresponding copolymer of ethylene and the isopropyl ester of acrylic and/or methacrylic acid. Generally, the thermal decomposition of the ester moiety of the ethylene-isopropyl acrylate and/or methacrylate copolymer will be accomplished at a temperature above the ester decomposition temperature at the pressure of decomposition. When the decomposition is effected in an inert atmosphere, a second step is required to convert the anhydride groups to the corresponding acid groups. This latter conversion can, however, be accomplished directly by effecting the decomposition in the presence of steam or ammonia. Moreover, the melt index of the resulting copolymer can be controlled by controlling the concentration of the steam or ammonia during the decomposition step. As will be readily apparent, this method exhibits a distinct economic advantage over the prior art processes and permits the production of a copolymer having any desired melt index. It has recently been discovered, however, that the melt index of the copolymer thus prepared is not stable and that the same increases significantly with time after production. For reasons believed readily apparent, it would be most desirable to maintain the economic advantage of this method while, at the same time, producing a copolymer product having a stable melt index.

SUMMARY OF THE INVENTION

It has now been found that the foregoing and other disadvantages of the prior art processes and products can be overcome by the method of and with the products of this invention. It is, therefore, an object of this invention to provide an improved method of preparing a copolymer of ethylene and an ethylenically unsaturated carboxylic acid. It is another object of this invention to provide an improved thermal decomposition method of producing a copolymer of ethylene and an ethylenically unsaturated carboxylic acid. It is still another object of this invention to provide a thermal decomposition method for producing a copolymer of ethylene and an ethylenically unsaturated carboxylic acid having a stable melt index. It is yet another object of this invention to provide a copolymer of ethylene and an ethylenically unsaturated carboxylic acid prepared by a thermal decomposition method and having a stable melt index. Still other objects will become apparent from the disclosure set forth hereinafter.

In accordance with the present invention, the foregoing and other objects and advantages are accomplished by first heating a copolymer of ethylene and an isopropyl ester of acrylic and/or methacrylic acid to a temperature above the isopropyl ester decomposition temperature so as to convert at least a portion of the ester groups and thereafter contacting the thermally decomposed, acid conaining polymer with a diamine so as to stabilize the melt index thereof. The thermal decomposition of the ester containing polymer will be accomplished in either an inert atmosphere or in the presence of steam or ammonia. The thermally decomposed, acid containing copolymer will then be contacted with an aqueous solution of a diamine or a diamine vapor under relatively mild conditions so as to minimize the amount of diamine incorporated into the polymer.

DETAILED DESCRIPTION OF THE INVENTION

Figure 1:
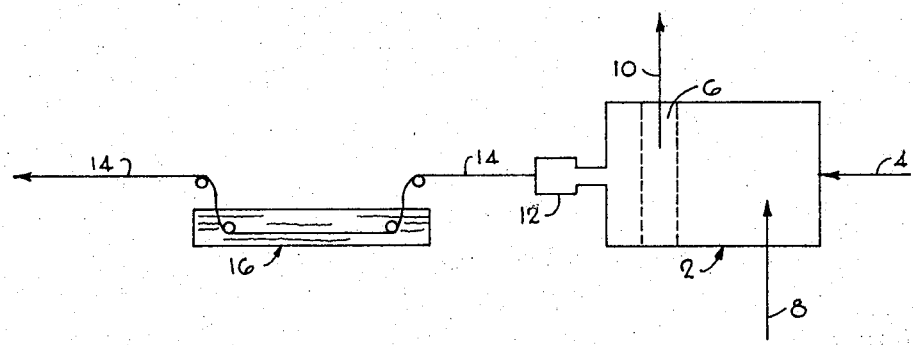
FIG. 1 is a flow diagram of a method within the scope of the present invention wherein a thermally decomposed copolymer is contacted with an aqueous solution of a diamine.

Broadly, the present invention relates to a method of preparing copolymers of ethylene and acrylic and/or methacrylic acid, which polymers exhibit a stable melt index, and to the polymers prepared thereby. The method consists of first thermally decomposing at least a portion of the isopropyl ester groups of a copolymer of ethylene and the isopropyl ester of acrylic and/or methacrylic acid so as to convert at least a portion of said groups to the acid form and thereafter contacting the acid containing copolymer with a diamine.

The copolymers of ethylene and the isopropyl ester of acrylic and/or methacrylic acid which are thermally decomposed by the method of this invention and which are sometimes referred to herein as the isopropyl ester containing copolymer or copolymers can be prepared by conventional methods known to the art. A suitable method is described in U.S. Pat. No. 3,350,372 wherein it is stated that ethylene and an alkyl acrylate (to include the isopropyl ester of acrylic or methacrylic acid) are copolymerized at pressures of the order of 10,000–40,000 p.s.i. and at temperatures of at least 200° F. The polymerization reaction can be conducted in the presence of a free-radical polymerization initiator and in the absence of any added solvent other than for minor quantities of catalyst carrier or telogenating agents.

Free-radical polymerization initiators employed in the copolymerization process can be selected from those normally employed in the homopolymerization of ethylene, such as the organic peroxides, e.g., lauroyl peroxide, ditertiary butyl peroxide, and tertiary butyl peracetate, an azo compound such as $\alpha,\alpha$-azobisisobutyronitrile and $\alpha,\alpha$-azobisethylisobutyrate. Typically the free-radical polymerization initiator will be dissolved in a suitable organic liquid such as benzene, mineral oil or the like. Ordinarily, the free-radical initiator will be used at a level of the order of 50 to 20,000 p.p.m. or preferably 100–250 p.p.m. based upon the monomers charged to the reactor.

In general, the method of the present invention will be operative with any copolymer of ethylene and an isopropyl ester of acrylic and/or methacrylic acid. It is preferred, however, that the isopropyl ester containing copolymer be a solid at room temperature and pressure with a melt index within the range of about 0.1 to about 10 and that the same contain isopropyl ester units in an amount ranging between about 1 and 50 mol percent.

In general, the isopropyl ester groups of the ethylene-isopropyl ester copolymer can be converted to the acid group by heating said copolymer to a temperature above the thermal decomposition temperature of the isopropyl ester. At atmospheric pressure, the copolymerized isopropyl esters of both acrylic and methacrylic acids will decompose at an acceptable rate above about 325° C. Heating to this temperature is, therefore, preferred, even though some decomposition may occur at lower temperatures. It will, of course, be appreciated that the extent of decomposition can be controlled by controlling both the time and temperature of the decomposition step. It will also be appreciated that the rate of decomposition at any given temperature will vary, to some extent, with the pressure employed during the decomposition. In the present invention, it is preferred that the decomposition be effected under conditions and for a sufficient period of time to achieve substantially a complete conversion of the isopropyl ester groups.

In general, the thermal decomposition of the isopropyl ester containing polymer can be accomplished in an inert atmosphere in a manner such as that described in U.S. Pat. No. 3,557,070 or in the presence of steam or ammonia in a manner such as that described in copending U.S. application Ser. No. 70,899, which was filed Sept. 9, 1970 in the names of Harry D. Anspon, Bert H. Clampitt and Ronald E. Gilbert, and which issued as U.S. Pat. No. 3,674,761 on July 4, 1972, both of which written descriptions are incorporated herein by reference.

As set forth in the specification of U.S. Pat. No. 3,557,070, when the thermal decomposition is accomplished in an inert atmosphere the isopropyl ester groups are converted to the corresponding acid anhydride. The acid anhydride groups are then converted to the acid form by contacting the copolymer with steam or to an equal mixture of acid and amide groups by contacting the copolymer with ammonia. Generally, the acid anhydride groups will be converted at a temperature above about 200° C. and at or near atmospheric pressure and the extent of conversion can be controlled by controlling the actual temperature employed and the contacting time. In a preferred embodiment, these variables will be controlled so as to insure a substantially complete conversion of the anhydride groups.

As set forth in the disclosure of copending U.S. application Ser. No. 70,899, now U.S. Pat. No. 3,674,761 when the thermal decomposition is accomplished in the presence of steam and/or ammonia, the isopropyl ester groups will be converted directly to the acid form or to a mixture of the acid and amide forms. Moreover, the melt index of the acid containing copolymer may be controlled by controlling the concentration of the steam and/or ammonia.

Again, and as disclosed in the aforementioned copending application, the thermal decomposition will be accomplished at a temperature of at least 325° C. and the extent of conversion of the ester groups can be controlled by controlling the actual temperature employed and the time at which the copolymer is maintained at this temperature. Moreover, the concentration of steam and/or ammonia present during the thermal decomposition will range, generally, between about 1 to about 500 mols per mol of the isopropyl ester. In this way, the melt index of the acid containing copolymer product may be controlled within the range of less than 1 to about 550 with the higher melt indices corresponding to higher steam and/or ammonia concentrations during the thermal decomposition.

Once the copolymer of ethylene and acrylic and/or methacrylic acid, which copolymer is sometimes referred to herein as the thermally decomposed copolymer and sometimes as the acid containing copolymer, is obtained at the melt index desired for a particular purpose, the melt index will then be stabilized aginst further change by contacting said copolymer with a diamine. In this regard, it should be noted that while the copolymer of ethylene and acrylic and/or methacrylic acid will, generally, be produced at the desired melt index, it is within the scope of the present invention to produce the same at a lower melt index and then allow the same to increase, as a result of storage and/or exposure to oxygen and/or water, to the desired value and then stabilizing the same by contact with a diamine.

As has been noted, supra, the diamine treatment of the present invention may be accomplished by contacting the acid containing polymer with an aqueous solution of a diamine or with a diamine vapor. In general, the acid containing polymer may be treated with the diamine immediately after the thermal decomposition step or the same may be subjected to other treatment such as water washing and/or shaping into a film or pellets or the same may be stored prior to treatment. In this regard, it should be noted that the acid containing polymer may be effectively treated with the diamine in essentially any shape or form, and that the diamine treatment may be effected by contacting the diamine with a copolymer strand discharged from an extruder, with pellets of the copolymer or stabilization is effected by contacting the copolymer.

Broadly, any primary and/or secondary diamine may be used in the method of the present invention to stabilize the melt index of a copolymer of ethylene and acrylic and/or methacrylic acid. When the diamine treatment or stabilization is effected by contacting the copolymer with an aqueous solution of the diamine, it is, however, important that the diamine be soluble in water at the conditions employed during the treatment, at least to the extent required to form the treating or contacting solution. Similarly, when the diamine is employed in the vapor phase, it is important that the vapor pressure thereof, at the conditions employed during contacting, be sufficiently high to insure a reasonable driving force for any chemical reaction which may occur during said contacting. In this regard, it will be appreciated that increased temperatures will increase both the solubility and the vapor pressure of a diamine and it is within the scope of the present invention to vary the treating temperature so as to permit the use of a maximum number of diamines. In any case, however, the treating temperature will always be below the decomposition temperature of the copolymer thus treated.

More specifically, the diamines useful in the present invention may be represented generally by the formula:

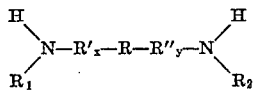

wherein R is selected from the group consisting of: alkylene radicals having from 1 to 12 carbon atoms therein; mono- and dicyclicalkylene radicals having from 5 to 12 carbon atoms therein; and arylene radicals; R' and R'' are independently selected from the group of alkylene radicals having 1 to 6 carbon atoms therein; $R_1$ and $R_2$ are independently selected from the group consisting of hydrogen and alkyl radicals having 1 to 4 carbon atoms therein, and wherein either $R_1$ and $R_2$ may be joined with R to form a cycloalkylene radical when either $R_1$ or $R_2$ contains one or more carbon atoms and R is an alkylene radical; and $x$ and $y$ are independently selected from the group of integers consisting of 0 to 1, with the proviso that when R is alkylene, both $x$ and $y$ will be zero. Diamines useful in the method of the present invention include, but are not limited to, methylene and ethylene diamines, pentamethylene and hexamethylene diamines, paraphenylene diamine, dicyclohexyl diamine and 1,4 cyclohexane bis (methylamine).

In general, the diamine treatment will be effected under conditions such that the diamine content of the treated polymer does not exceed about 5000 p.p.m. by weight, preferably such that the same does not exceed 1000 p.p.m. by weight and most preferably such that the same does not exceed 100 p.p.m. by weight, while at the same time insuring sufficient contacting to enhance the stability of the treated copolymer. Broadly, satisfactory results will be obtained at essentially any temperature and pressure, when the acid containing copolymer is contacted with an aqueous solution comprising the diamine, provided that the concentration of the diamine in solution and the contacting time are controlled accordingly. Low temperatures and low diamine concentrations will, however, require long contacting times. For this reason, when the diamine treatment is accomplished with an aqueous solution, the treatment will be effected, generally, at a temperature between about 0 and 50° C. with an aqueous solution containing between about 1 wt. percent to about 20 wt. percent of the diamine. In general, the contacting time will range from about 10 seconds to about 60 minutes, with the longer contacting time being required at the lower temperatures and diamine concentrations.

Similarly, satisfactory results will be obtained at essentially any temperature and diamine partial pressure when the acid containing copolymer is contacted with a diamine vapor, provided that the contacting time is properly controlled. Again, however, low temperatures and corresponding low vapor pressures will require long contacting times. For this reason, when the diamine treatment is accomplished with a diamine vapor, the treatment will be effected, generally, at a temperature between about 0 and 100° C. with a contacting time between about 2 minutes and 30 hours. The longer contacting time will, of course, correspond to the lower temperatures and vapor pressures.

Having thus broadly described the present invention, it is believed that the same will become readily apparent by reference to the appended drawings. Referring then to FIG. 1, there is shown a flow diagram of one embodiment of the present invention wherein the diamine treatment is accomplished by contacting the acid containing polymer with an aqueous solution of a suitable diamine. As can be seen then in the figure, a suitable copolymer of ethylene and isopropyl acrylate and/or isopropyl methacrylate is fed to a melt extruder 2 through line 4. Generally, the extruder will comprise a plurality of stages, each of which may be operated at a different temperature, and at least one stage 6 will be operated above a temperature of 325° C. so as to decompose the isopropyl ester therein. The holding time in this stage can, of course, be controlled by controlling its size and the flow rate of copolymer entering through line 4. In the embodiment illustrated, steam and/or ammonia may be fed, in controlled amounts, through line 8. The decomposition product from the decomposition stage 6 will be withdrawn through line 10. After the desired decomposition to produce an acid containing copolymer, the acid containing copolymer is passed through die 12 so as to produce a continuous strand 14—14 of said copolymer.

The continuous strand 14—14 from the extruder die is then passed through water bath 16 so as to cool the same. In the embodiment illustrated, the coolant is an aqueous solution of a suitable treating diamine and in this way, the cooling and diamine treatment are effected simultaneously. The contacting temperature can, of course, be controlled by controlling the temperature of the cooling media. In addition, the contacting time can be controlled by controlling the length of the strand 14—14 in contact with the cooling media and by controlling the flow rate of polymer to the extruder. After the strand 14—14 is withdrawn from the water bath 16, the same may then be converted to pellets for storage and subsequent use or the same may be passed to a second extruder and shaped into a self-supporting film.

It will, of course, be appreciated that the cooling and diamine treatment could be effected separately. It will also be appreciated that, when the polymer is converted to a film prior to the diamine treatment, the treatment may be accomplished in substantially the same manner as illustrated in FIG. 1; i.e., by passing the film through an aqueous solution of a suitable diamine.

Figure 2:
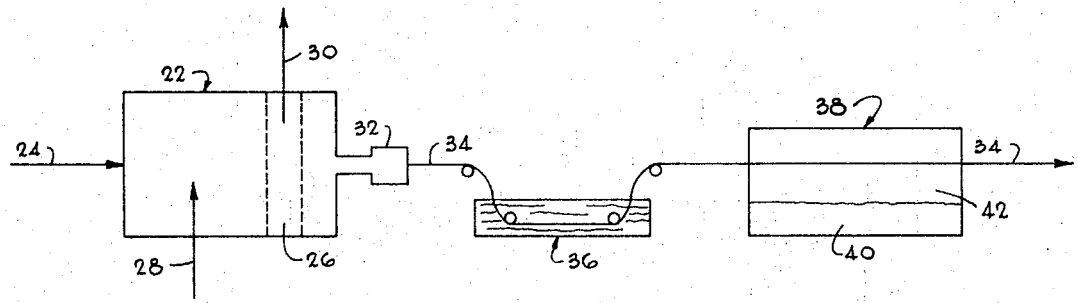
FIG. 2 is a flow diagram of a method within the scope of the present invention wherein a thermally decomposed copolymer is contacted with a diamine vapor.

Referring now to FIG. 2, there is shown a second embodiment of the present invention wherein the diamine treatment is accomplished by contacting the acid containing copolymer with a diamine vapor. As in the previously described embodiment, and as can be seen in the figure, a suitable copolymer of ethylene and isopropyl acrylate and/or isopropyl methacrylate is fed to a melt extruder 22 through line 24. Generally, the extruder will comprise a plurality of stages, each capable of operation at a different temperature, and at least one of said stages, herein referred to as the decomposition stage 26, will be operated at a temperature above 325° C. Steam and/or ammonia may be fed to the decomposition stage 26 through line 28 and the decomposition products withdrawn through line 30. The decomposition product is then passed through die 32 and withdrawn from the extruder as a continuous strand 34—34.

The continuous strand 34—34 of acid containing copolymer from the extruder die 32 is then passed through a water cooling bath 36 and then into vapor contactor 38. In the embodiment illustrated, liquid diamine 40 is maintained in the contactor 38 and the copolymer strand 34—34 passed through the vapor phase 42 thereof. As will be readily apparent, the liquid diamine may be heated to increase its partial pressure in the vapor phase. Moreover, the contacting time in the contactor may be controlled by controlling its length and/or the speed of the strand passing therethrough. After the strand 34—34 has passed through the vapor contactor, the same may then be pelletized and stored, subjected to further treatment or used directly, as desired.

In general, the acid containing copolymers produced by the method of this invention will exhibit melt indices between about 0.5 and 550 and will be useful for any purpose for which copolymers of ethylene and acrylic and/or methacrylic acid are known to be useful such as in coating compositions, adhesives, etc. Moreover, the copolymers of the present invention are particularly useful in the preparation of safety glass laminates wherein a self-supporting film of said copolymer is employed as the inner layer.

PREFERRED EMBODIMENT

In a preferred embodiment of the present invention, a copolymer of ethylene and acrylic and/or methacrylic acid will be prepared from a copolymer of ethylene and isopropyl acrylate and/or isopropyl methacrylate containing from 1 to 50 mol percent of the ester by the thermal decomposition of the ester portion thereof at a temperature above 325° C. and the resulting acid containing copolymer stabilized by contacting the same with an aqueous solution of a diamine selected from the group consisting of the alkylene diamines having 1 to 12 carbon atoms and the cycloalkylene diamines having 5 to 12 carbon atoms. The alkylene diamines, especially ethylene diamine, are particularly preferred.

In the preferred embodiment, the decomposition time and temperature will be controlled such that substantially all of the isopropyl ester groups are converted. Moreover, the decomposition will be effected in the presence of steam at a concentration within the range of about 1 to 10 mols of steam per mol of ester so as to produce a copolymer product wherein substantially all of the ester moieties are converted to the acid form and having a melt index between <1 to about 550.

In this embodiment, the decomposition will be accomplished in a vented, melt extruder and the extrudate will be passed immediately through an aqueous solution of the diamine so as to stabilize the melt index at or near the value of the acid containing copolymer as produced in the decomposition step. The aqueous solution will contain between about 5 and 15 wt. percent of the diamine, most preferably 9 to 12 wt. percent, and the contact time will range between 10 seconds and 2 minutes so as to produce a stabilized product having less than about 1000 p.p.m. by weight of diamine therein and most preferably less than 100 p.p.m. by weight. Following the diamine treatment, the stabilized polymer will be pelletized and later converted to a self-supporting film for use in a safety glass laminate.

The following examples demonstrate the effectiveness of the present invention but are in no way intended to limit the same.

Example 1

In this example, a copolymer of ethylene and acrylic acid was prepared by the method of the present invention except that the diamine treatment was omitted so as to provide a comparative basis for the results obtained in the subsequent examples. Specifically, a copolymer of ethylene and isopropyl acrylate containing 25 wt. percent of the isopropyl ester and having a melt index of 2 as determined by employing the standard test commonly designated as ASTM–D–1238–62T was introduced at the rate of 9 pounds per hour into a 2½ inch single-screw, vented extruder manufactured by Black Clawson Co. The extruder contained six stages or zones capable of operation at different temperatures and these were operated at temperatures of 115° C., 360° C., 385° C., 380° C., 288° C. and 237° C., respectively, from inlet to outlet. At the outlet of the extruder, the thermally decomposed copolymer passed through a strand die. The product copolymer was then cooled to room temperature in a water bath similar to that designated as 16 in FIG. 1. A portion of the thermally decomposed copolymer product was then stored, at room temperature, in a moist atmosphere so as to accelerate any polymer degradation due to water and/or oxygen.

In the copolymer product, substantially all of the isopropyl ester groups were converted to the acid form. The melt index of the product from the extruder was found to be 0.3, but after 24 hours storage in a moist atmosphere, the melt index had increased to 60. These results are tabulated in the table, infra, for easy comparison with the results of Examples 2–7.

Example 2

A copolymer of ethylene and isopropyl acrylate containing 25 wt. percent of the ester and having a melt index of 2 was fed to the 2½ inch Black Clawson single-screw extruder employed in Example 1 at a rate of 9 pounds per hour. The temperature throughout the extruder as well as other process conditions were substantially identical to those employed in Example 1. In this example, however, the cooling media employed in the water bath was an aqueous solution containing 10 wt. percent ethylene diamine and the product polymer was in contact with said solution for 2 minutes. Again, a portion of the copolymer product, which was an ethylene-acrylic acid copolymer, was stored, at room temperature, in a moist atmosphere identical with that of Example 1. The melt index of the product from the extruder was 0.0 and, after 24 hours storage in the moist atmosphere, the melt index was unchanged. The nitrogen content of the treated polymer, as determined by the Kjeldahl test, was found to be less than 5 p.p.m. by weight.

Example 3

The run of Example 2 was repeated except that an aqueous solution containing 10 wt. percent hexamethylene diamine was used as the cooling media in the water bath. Again, the product had a melt index of 0.0 from the extruder after 24 hours storage in the moist atmosphere. The nitrogen content of the treated polymer, as determined by the Kjeldahl test, was less than 5 p.p.m. by weight.

Example 4

A copolymer of ethylene and isopropyl acrylate containing 29 wt. percent of the ester and having a melt index of 0.9 was thermally decomposed in the 2½ inch Black Clawson single-screw, vented extruder used in Example 1 by feeding said polymer thereto at a rate of 9 pounds per hour under the same conditions employed in Example 1. In this example, however, the cooling media employed in the water bath was an aqueous solution containing 10 wt. percent dicyclohexyl diamine and the product polymer was in contact with said solution for 2 minutes. Again, a portion of the copolymer product, which was an ethylene-acrylic acid copolymer, was stored, at room temperature, in a moist atmosphere identical with that of Example 1. The melt index of the product from the extruder was 0.08 and, after 24 hours storage in the moist atmosphere, the melt index was 0.31. The nitrogen content of the treated polymer, as determined by the Kjeldahl test, was found to be less than 5 p.p.m. by weight.

Example 5

The run of Example 4 was repeated except that the cooling media employed in the water bath was an aqueous solution containing 10 wt. percent dicyclohexyl diamine and the acid containing polymer was not contacted therewith until its melt index had increased to 8.5. After contacting with the diamine, a portion of the copolymer product, which was an ethylene-acrylic acid copolymer, was stored, at room temperature, in a moist atmosphere identical with that of Example 1. The melt index of the product remained 8.5 after 24 hours storage in the moist atmosphere. The nitrogen content of the treated polymer, as determined by the Kjeldahl test, was found to be less than 5 p.p.m. by weight.

Example 6

A copolymer of ethylene and isopropyl acrylate containing 30 wt. percent of the ester and having a melt index of 2 was thermally decomposed in a manner identical to that of Example 4 except that the cooling media employed in the water bath was an aqueous solution containing 10 wt. percent 1,4 cyclohexane bis methylamine. Again, a portion of the copolymer product, which was an ethylene-acrylic acid copolymer, was stored, at room temperature, in a moist atmosphere identical with that of Example 1. The melt index of the product from the extruder was 1.65 and, after 24 hours storage in the moist atmosphere, the melt index was 1.66. The nitrogen content of the treated polymer, as determined by the Kjeldahl test, was found to be less than 5 p.p.m. by weight.

Example 7

The run of Example 6 was repeated except that the cooling media employed in the water bath was an aqueous solution containing 10 wt. percent dicyclohexyl diamine and the acid containing copolymer was not contacted therewith until its melt index had increased to 3.5. After the diamine contacting, a portion of the copolymer product, which was an ethylene-acrylic acid copolymer, was stored, at room temperature, in a moist atmosphere identical with that of Example 1. The melt index of the product remained 3.5 after 24 hours storage in the moist atmosphere. The nitrogen content of the treated polymer, as determined by the Kjeldahl test, was found to be less than 5 p.p.m. by weight.

The results of Examples 1–7 are summarized in the table below:

| | | Melt index | |
|---|---|---|---|
| Example no. | Diamine | Initial | After 24 hours' storage |
| 1 | None | .3 | 60 |
| 2 | Ethylene diamine | 0 | 0 |
| 3 | Hexamethylene diamine | 0 | 0 |
| 4 | Dicyclohexyl diamine | 0.08 | 0.31 |
| 5 | Paraphenylene diamine | 8.5 | 8.5 |
| 6 | 1,4 cyclohexane bis methylamine | 1.65 | 1.66 |
| 7 | Dicyclohexyl diamine | 3.5 | 3.5 |

Example 8

A copolymer of ethylene and isopropyl acrylate containing 30 wt. percent of the ester and having a melt index of 2 was thermally decomposed in the 2½ inch Black Clawson extruder under conditions identical to those employed in Example 1. In this example, however, a portion of the product copolymer, after cooling, was contacted with ethylene diamine vapor at 72° F. for 24 hours. The partial pressure of the diamine was about 10 mm. Hg during the entire contact period. After the diamine treatment, the treated product was stored in a moist atmosphere as in Example 1. The melt index of the prdouct, immediately after the diamine treatment, was 0.0 and after 24 hours storage in the moist atmosphere, the melt index was 0.38. Again, the nitrogen content of the copolymer product, as determined by the Kjeldahl test, was less than 5 p.p.m. by weight.

Examples 9 and 10

A portion of the untreated copolymer product from the run of Example 1 and a portion of the diamine treatment copolymer product of Example 6 were extruded into self-supporting films using a Sterling film extruder and an extrusion temperature of 400° F. The untreated product of Example 1 was converted to the film prior to any significant degradation thereof. The tensile strength and the tensile impact of the films thus produced are summarized below:

| | Tensile strength | | | Tensile impact, ft./lbs. in. |
|---|---|---|---|---|
| Polymer | Yield, p.s.i. | Break, p.s.i. | Percent elongation | |
| Untreated | 810 | 4,146 | 977 | 89 |
| | 793 | 4,055 | 976 | 87 |
| Treated | 1,058 | 4,661 | 866 | 108 |
| | 1,261 | 4,791 | 855 | 119 |

From the foregoing examples, it is readily apparent that copolymers of ethylene and acrylic and/or methacrylic acid having stable melt indices can be prepared from copolymers of ethylene and isopropyl acrylate and/or isopropyl methacrylate by the method of the present invention. It is also readily apparent that the diamines may be effectively employed as a stabilizing agent either in the form of an aqueous solution or as a vapor. Moreover, it is apparent that the diamine treated copolymer products, while exhibiting properties different from the untreated copolymers, may be fabricated into self-supporting films and used in safety glass laminates.

Although the present invention has been described and illustrated by reference to particular embodiments thereof, it will be readily apparent that the same lends itself to various moidfications which will be obvious to those of ordinary skill in the art. Accordingly, reference should be made solely to the appended claims to determine the scope of the invention.

Having thus described and illustrated the present invention, what is claimed is:

1. A method of preparing a copolymer of ethylene and at least one ethylenically unsaturated carboxylic acid comprising the steps of:
   (a) heating a copolymer of ethylene and an isopropyl ester of at least one ethylenically unsaturated carboxylic acid selected from the group consisting of acrylic acid and methacrylic acid to a temperature equal to or above the thermal decomposition temperature of said isopropyl ester; and
   (b) thereafter contacting the thermally decomposed copolymer with a diamine, said diamine being selected from the group of diamines represented by the formula

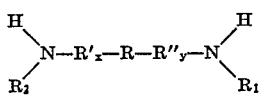

wherein R is selected from the group consisting of: alkylene radicals having from 1 to 12 carbon atoms therein; mono- and di-cyclicalkylene radicals having from 5 to 12 carbon atoms therein; and arylene radicals; R' and R'' are independently selected from the group of alkylene radicals having 1 to 6 carbon atoms therein; $R_1$ and $R_2$ are independently selected from the group consisting of hydrogen and alkyl radicals having 1 to 4 carbon atoms therein, and wherein either $R_1$ or $R_2$ may be joined with R to form a cycloalkylene radical when either $R_1$ or $R_2$ contains one or more carbon atoms and R is an alkylene radical; and $x$ and $y$ are independently selected from the group of integers consisting of 0 to 1, with the proviso that when R is alkylene, both $x$ and $y$ will be zero.

2. The method of claim 1 wherein said thermally decomposed copolymer is contacted with an aqueous solution of said diamine.

3. The method of claim 2 wherein the concentration of diamine in said aqueous solution is between about 5 and 15 wt. percent.

4. The method of claim 2 wherein the concentration of diamine in said aqueous solution is between about 9 and 12 wt. percent.

5. The method of claim 2 wherein the concentration of diamine in said aqueous solution is between about 1 and about 20 wt. percent.

6. The method of claim 5 wherein the thermally decomposed copolymer is contacted with said aqueous solution at a temperature between about 0 and about 50° C.

7. The method of claim 6 wherein said thermally decomposed copolymer is contacted with said aqueous solution for a period of time within the range of about 10 seconds to about 60 minutes.

8. The method of claim 7 wherein said diamine is an alkylene diamine.

9. The method of claim 7 wherein said diamine is a cycloalkylene diamine.

10. The method of claim 7 wherein said diamine is an arylene diamine.

11. The method of claim 1 wherein said thermally decomposed copolymer is contacted with a vapor of said diamine.

12. The method of claim 11 wherein said thermally decomposed copolymer is contacted with said vapor at a temperature between 0 and 100° C.

13. The copolymer product obtained by the method of claim 1.

14. The copolymer product obtained by the method of claim 7.

15. The copolymer product obtained by the method of claim 11.

References Cited
UNITED STATES PATENTS

| | | | |
|---|---|---|---|
| 3,674,761 | 7/1972 | Anspon et al. | 260—87.3 |
| 3,551,381 | 12/1970 | Stewart et al. | 260—45.9 R |

DONALD E. CZAJA, Primary Examiner

M. J. WELSH, Assistant Examiner

U.S. Cl. X.R.

260—86.7

UNITED STATES PATENT OFFICE
CERTIFICATE OF CORRECTION

Patent No. 3,769,261     Dated October 30, 1973

Inventor(s) Bert H. Clampitt, Joseph W. Jones, Jr., Raymond M. Henry

It is certified that error appears in the above-identified patent and that said Letters Patent are hereby corrected as shown below:

Column 2, line 10, "ethyylene" should be --ethylene--.

Column 3, line 17, "conaining" should be --containing--.

Column 5, line 8, "aginst" should be --against--.

Column 5, line 32, delete Line 32 and substitute the following:

--or with a film subsequently formed with said copolymer.--

Column 5, line 37, "effected" should be --affected--.

Column 10, line 72, "moidfications" should be --modifications--.

Signed and sealed this 20th day of August 1974.

(SEAL)
Attest:

McCOY M. GIBSON, JR.
Attesting Officer

C. MARSHALL DANN
Commissioner of Patents